Dec. 31, 1968   W. W. CEASE   3,419,186
ARTICLE DISPENSER
Filed April 5, 1967   Sheet 1 of 3
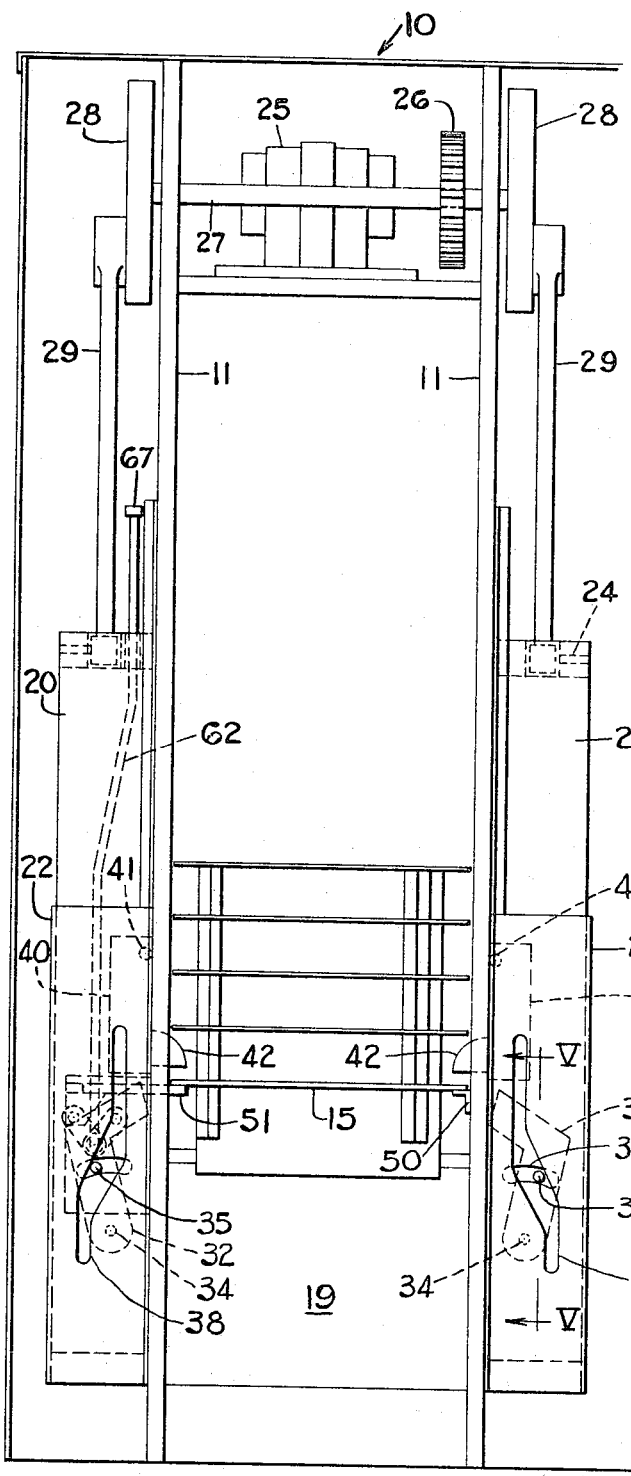
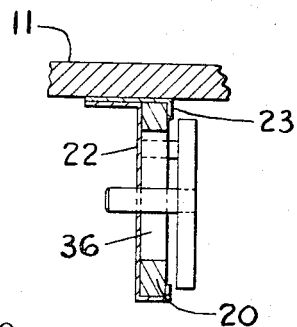
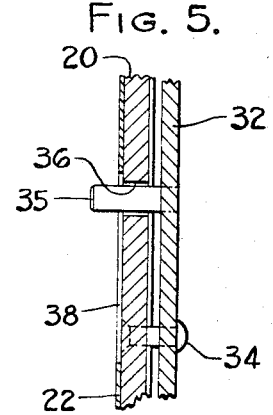
INVENTOR.
WILLIAM W. CEASE
BY
Christel & Bean
ATTORNEYS Dec. 31, 1968 W. W. CEASE 3,419,186
ARTICLE DISPENSER
Filed April 5, 1967
FIG. 3.
FIG. 6.
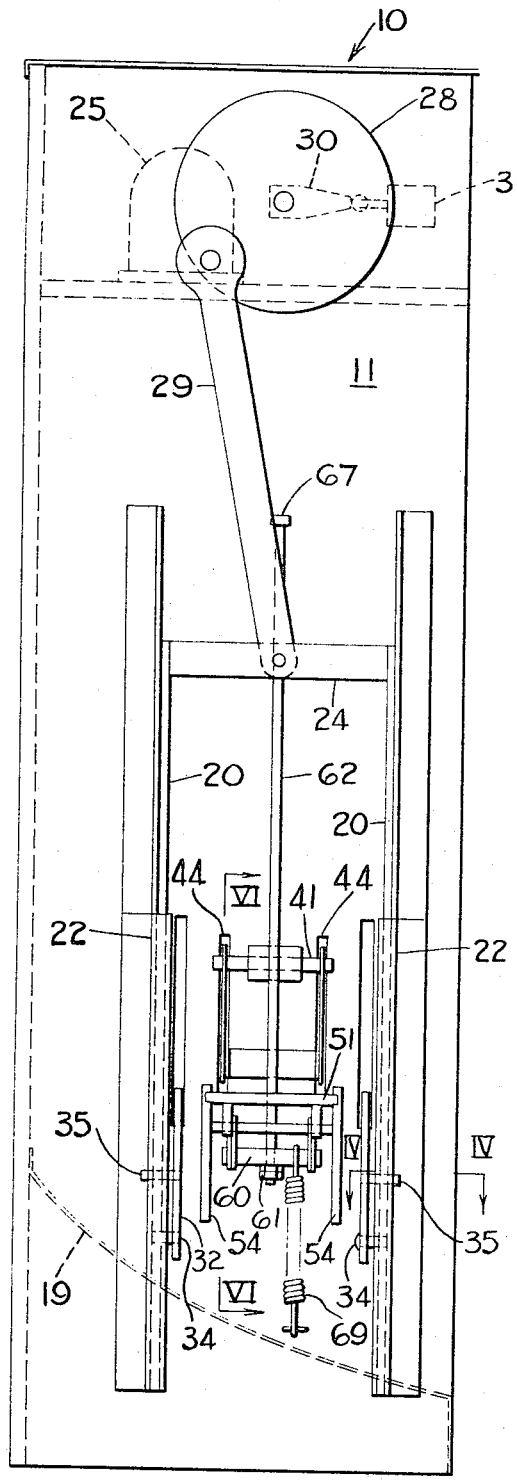
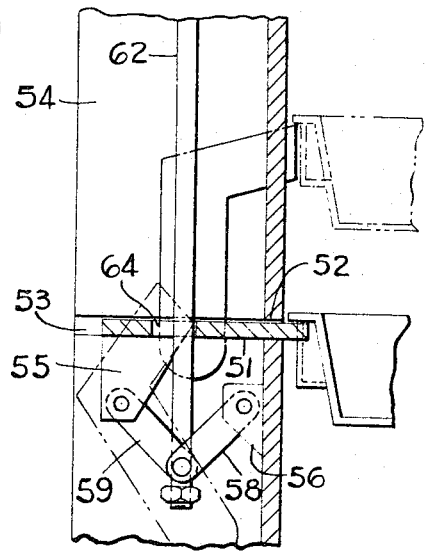
INVENTOR.
WILLIAM W. CEASE
BY
Christel & Bean
ATTORNEYS

United States Patent Office 3,419,186
Patented Dec. 31, 1968

3,419,186
ARTICLE DISPENSER
William W. Cease, Fredonia, N.Y., assignor to
Cease Central, Inc., Dunkirk, N.Y.
Filed Apr. 5, 1967, Ser. No. 628,596
6 Claims. (Cl. 221—221)

ABSTRACT OF THE DISCLOSURE

Dispensing apparatus for a stack of containers including a pair of support members at opposite sides of the apparatus for supporting the stack by engaging opposite sides of the lowermost container with lifting means for engaging a container above the lowermost container to move the remainder of the stack upwardly from the lowermost container and with at least one of the support members laterally retractable to permit the lowermost container to fall to a dispensing position with the remainder of the stack lifted therefrom.

---

This invention relates to apparatus for dispensing food or article containers and more particularly to apparatus for handling composite stacks of such containers wherein the lowermost container of a stack is separated from the stack and dispensed from the apparatus.

The new and useful dispensing apparatus herein defined provides mechanism for supporting a stack of containers and apparatus for lifting superposed containers from a lowermost container whereby the lowermost container is released and permitted to drop to a dispensed position. The stack lifting apparatus is similar to that illustrated in my U.S. Letters Patent 3,189,219 dated June 15, 1965, with the present dispensing apparatus constructed to dispense the lowermost container of a stack by dropping such container to a dispensed position at a predetermined point in the stack lifting cycle.

Various other novel features of construction and advantages inherent in the dispensing apparatus of the present invention are pointed out in detail in conjunction with the accompanying drawing and following description of a typical embodiment thereof.

In the drawings:

FIG. 1 is a fragmentary front elevational view of one form of the dispensing apparatus of the present invention showing a dispensing section in rest position between dispensing cycles;

FIG. 3 is a side elevational view of the apparatus shown in FIG. 1 viewed from the left hand side;

FIG. 4 is a fragmentary cross sectional view taken about line IV—IV of FIG. 3;

FIG. 5 is a fragmentary cross sectional view taken about line V—V of FIG. 1;

FIG. 6 is a fragmentary cross sectional view taken approximately on the line VI—VI of FIG. 3;

Figure 2:
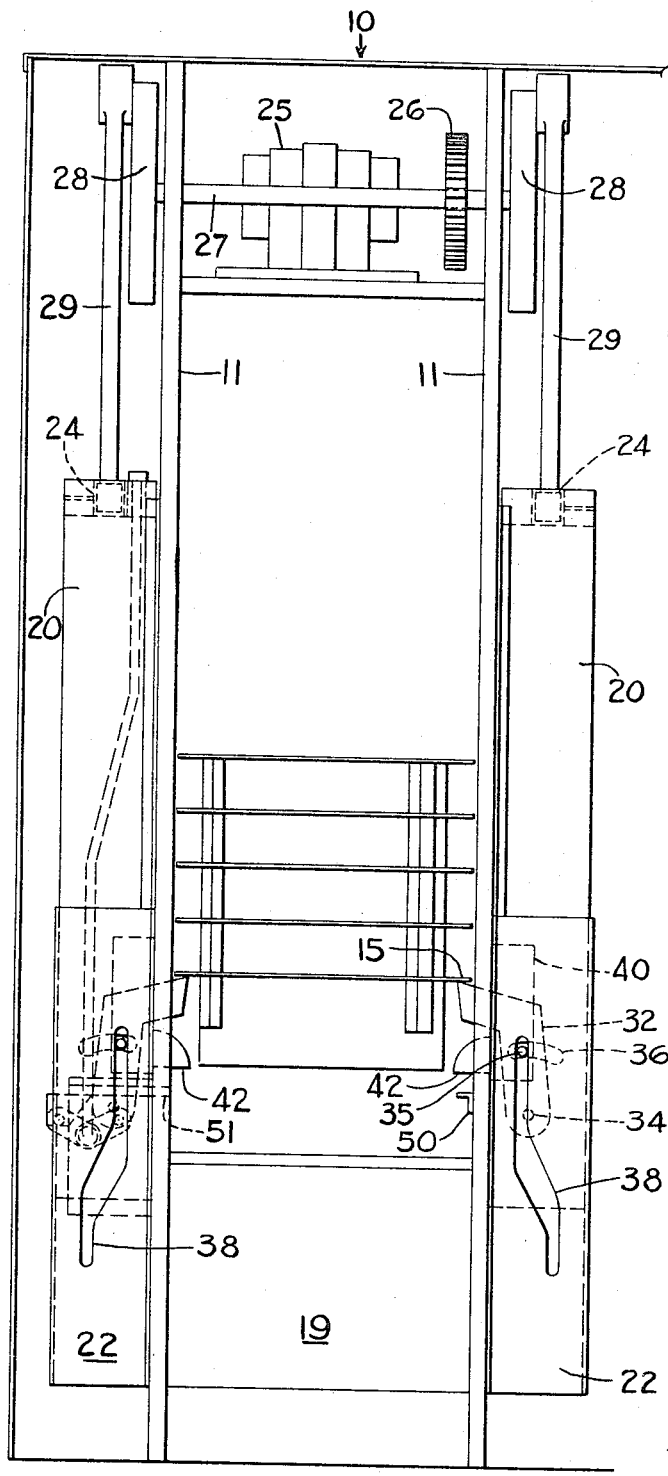
FIG. 2 is a view similar to FIG. 1 but with the lowermost container dispensed and the remainder of the stack lifted.

Like characters of reference denote like parts throughout the several figures of the drawings. FIGS. 1, 2 and 3 are fragmentary views of a dispensing cabinet showing a single stack or tier of containers within a dispensing section, although it will be understood that any number of additional sections may be utilized in the cabinet to dispense other similar containers or other stacked articles as desired.

In FIGS. 1, 2 and 3, the numeral 10 designates generally a cabinet enclosure having, for each dispensing section, a pair of vertically extending spaced wall members 11 which support the entire container supporting and dispensing mechanism for each tier or stack of containers 12.

Figure 7:
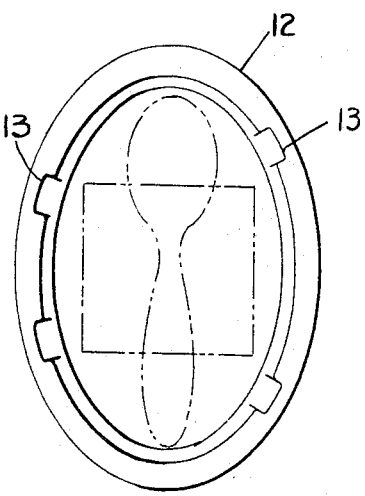
FIG. 7 is a top plan view of one form of container which may be employed in the present apparatus.
Figure 8:
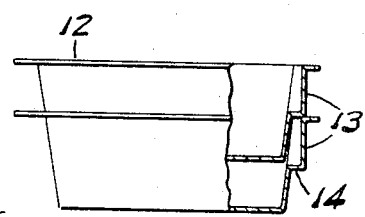
FIG. 8 is an end elevational view of the container of FIG. 7, partly in cross section.

While not limited thereto, containers 12 in the present instance are elliptical and bowl shaped. As shown in FIGS. 7 and 8 each container has four outwardly projecting peripherally spaced hollow lugs 13 having ledges 14 at the bottom thereof intermediate the top and bottom of the container. The sides of the containers and the lugs slope inwardly whereby the containers may be closely stacked, the lugs 13 of one container receiving the lugs of the next superjacent container.

As shown in FIG. 7, the lugs 13 at one side of the container are spaced differently from the lugs at the opposite side so that, by reversing alternate containers, the ledges 14 of the lugs 13 of one container seat on an upper peripheral flange 15 of the container next below as shown in FIG. 8. Thus the stacked containers as employed in dispensing operations nest partially one within the other with each container bottom spaced from the bottom of an adjacent container to provide a food or article carrying space therebetween. In FIG. 7 a spoon and crackers are shown in dot and dash lines, the package thus dispensed being used by the vendee to contain soup obtained in any desired manner. The foregoing container construction is merely one preferred form for use with the dispensing apparatus of the present invention although use of the dispensing apparatus with other containers is contemplated.

The means for supporting a stack of containers in position to dispense the containers individually from the bottom of the stack and for actually dispensing the same onto a chute 19 or similar dispensing area in cabinet 10 below the stack will now be described. In FIGS. 1 through 3, the numeral 20 designates a pair of operating bars which extend vertically along the outer sides of each wall 11 and are each retained and guided for vertical movement, as best shown in FIG. 4, by retaining flange members 22 and 23 which are fixed to the outsides of walls 11.

The two bars 20 at the outside of each wall 11 are rigidly connected at their upper ends to a cross bar 24. A motor and reducing gear unit or a slow speed motor 25 is mounted in the upper end of cabinet 10 above the stack and has an output shaft connected through suitable gearing 26 to a crank shaft 27. The opposite ends of shaft 27 extend laterally through walls 11 and rotate crank wheels 28. Rods 29 connect between crank wheels 28 and crossbars 24 for vertical reciprocation of operating bars 20. As seen in FIG. 3, shaft 27 has a projecting arm 30 which actuates a limit switch 31 fixed to cabinet 10. Upon actuation of motor 25, a single cycle of operation, involving a lowering and raising movement of the bars, is effected with arm 30 rotating with shaft 27 to engage limit switch 31 to open the motor circuit after the completion of each cycle.

Stack supporting dogs 32 are pivoted at their lower ends to the several bars 20, as at 34, their upper ends being adapted to project inwardly through slots in the walls 11 to engage the peripheral flanges 15 of containers 12. A pin 35 extends from each dog 32 through an arcuate clearance slot 36 in each bar 20 and into a cam slot 38 formed in each retaining flange members 22. In addition to the foregoing, the dispensing mechanism includes hold-down members 40, which are pivoted at their upper ends to walls 11 at 41 and have toe formations 42 at their lower ends which project through slots 44 in walls 11. The hold-down members normally assume the position illustrated in FIGS. 1 and 2 under the force of gravity but are freely swingable in an outward direction when container flanges 15 move downwardly against the rounded upper surfaces of the toe formations 42.

The novel means of the present invention for receiving the lowermost members of a stack and for releasing the same for final dispensing will now be described. Such means comprises a pair of opposed ledges and means whereby either one or both ledges may be retracted to permit a container to fall to dispensing position. In FIGS. 1 through 3 the ledge at only one side of the dispensing unit is retractable.

The retractable ledge comprises a horizontal sliding shelf or ledge 51 which projects inwardly through a slot 52 in wall 11 to engage the underside of flange 15 at one side of a container 12. Shelf 51 reciprocates between projected and retracted positions in guide slots 53 disposed in opposed flanges 54 fixed to the outside of wall 11 between retaining flanges 22. Spaced brackets 55 depend from the underside of shelf 52 and cooperating lugs 56 are fixed to wall 11 below shelf 52. Two pairs of toggle links 58 and 59 are pivoted at opposite ends to lugs 56 and brackets 55. The adjacent ends of links 58 and 59 are pivotally connected by a cross shaft 60.

A vertical rod 62 is threaded into cross shaft 60 at its lower end and extends upwardly through a slot 64 in shelf 51 and through an opening in crossbar 24 and terminates in an enlargement nipple 67. The effective length of rod 62 is adjustable by means of its threaded engagement with shaft 60 and is locked in adjusted position by means of nut means 61 at its lower end. Cross shaft 60 is biased downwardly against adjusting nut 61 by an extension coil spring 69, thus urging shelf 51 into projected flange engaging position.

The operation of the dispensing apparatus will now be described. FIG. 1 shows the rest position of the parts wherein the bars 20 are between their upper and lowermost positions and shelf 51 projects through wall 11 and engages below flange 15 of the lowermost container. Shelf 51, together with angle member 50, supports this container and the superposed stack of containers between cycles of operation. The dogs, in rest position, are retracted due to overcenter gravity action thereon.

During the first part of an operating cycle, clockwise movement of crank wheel 28 from the position shown in FIG. 3 raises bars 20 and causes pins 35 to cam against the upper inclined surfaces of cam slots 38 which projects the upper ends of the dogs 32 through wall 11 above flange 15 of the lowermost container 12 to engage the flange 15 of the container next above. Continued upward movement of bars 20 causes dogs 32 to lift the entire superposed stack from the lowermost container 12, the lowermost container remaining supported on shelf 51 and angle member 50.

Before crank wheels 28 reach top dead center, crossbar 24 engages enlargement of rod 62, whereupon continued upward movement of bars 20 raises rod 62 and cross shaft 60 against the tension of spring 69 and causes toggle links 58 and 59 to straighten into alined relation, causing shelf 52 to move horizontally to the left from the position shown in FIGS. 1 and 4 which permits container 12 to fall from angle member 50 onto chute 19.

As noted earlier herein, the entire retractable shelf structure just described may be duplicated at the right hand side of enclosure 10 in place of the fixed member 50, thus permitting the container 12 to fall more or less straight down.

Continued rotation of crank wheels 28 causes bars 20 to move downwardly whereupon rod 62 and cross shaft 60 move downwardly under the bias of spring 69. Downward movement of cross shaft 60 causes links 59 to draw brackets 55 toward wall 11 and thus projects shelf 51 into the path of the descending stack. Flange 15 of the lowermost container of the stack pivots toe formations 42 outwardly from the path of descent, whereupon the upper ends of dogs 32 deposit the stack on shelf 51 and angle member 50. Further downward movement of bars 20 causes pins 35 to cam against the lower inclined surfaces of cam slots 38 and pivotally retracts the upper ends of dogs 32 to the outward overcenter position shown in FIG. 1. Continued rotation of crank wheels 28 returns the apparatus to rest position whereat lever 29 actuates the limit switch 30 to de-energize motor 25 and thus terminate a dispensing cycle.

Having thus described and illustrated a preferred embodiment of my invention, it will be understood that such description and illustration is by way of example only and that such modifications and changes as may suggest themselves to those skilled in the art are intended to fall within the scope of the present invention, which is limited only as defined in the appended claims.

The term "container" as used in the following claims is meant to include various kinds of stack units which may be employed in dispensing food or other articles. For instance, the elements supported by the dogs 32 and the shelf members 50 and 51 may be pallets having articles, containers or packages resting thereon. The term "container" is used as a matter of convenience to indicate various stack units such as pallets, packages and other articles which may be similarly supported.

I claim:

1. Apparatus for supporting a stack of containers and dispensing individual containers from the bottom of the stack comprising means for housing a stack of containers, means for supporting a stack of containers in said housing including a pair of support members at opposite sides of said housing for supporting said stack by engaging opposite sides of the lowermost container thereof, lifting means for engaging opposite sides of the container above said lowermost container and movable upwardly to raise the remainder of the stack from said lowermost container, one of said support members being laterally retractable to discharge the lowermost container by falling thereof to a lower position for dispensing from said apparatus, said stack lifting means being movable downwardly to dispose the next lowermost container of the stack on said pair of support members after said retractable member has returned to its projected position, means responsive to upward movement of said stack lifting means for retracting said one support member.

2. Apparatus according to claim 1 wherein both of said support members are simultaneously laterally retractable to release a lowermost container.

3. Apparatus according to claim 1 wherein said responsive means includes a vertically reciprocable member connecting with said one support member to reciprocate the latter laterally between projected and retracted positions.

4. Apparatus for supporting a stack of containers and dispensing individual containers from the bottom of the stack comprising means for housing a stack of containers, means for supporting a stack of containers in said housing including a pair of support members at opposite sides of said housing for supporting said stack by engaging opposite sides of the lowermost container thereof, lifting means for engaging opposite sides of the container above said lowermost container and movable upwardly to raise the remainder of the stack from said lowermost container, one of said support members being laterally retractable to discharge the lowermost container by falling thereof to a lower position for dispensing from apparatus, said stack lifting means being movable downwardly to dispose the next lowermost container of the stack on said pair of support members after said retractable member has returned to its projected position, a toggle linkage connecting with said one support member for projecting and retracting the same and an operating member connecting with said toggle linkage to reciprocate said one support member laterally between engaging and disengaging positions.

5. Apparatus according to claim 4 wherein said operating member is mounted for reciprocation and is engaged by said stack lifting means during upward movement thereof.

6. Apparatus for supporting a stack of containers dispensing individual containers from the bottom of the stack comprising means for housing a stack of containers, means for supporting a stack of containers in said housing including a pair of support members at opposite sides of said housing for supporting said stack by engaging opposite sides of the lowermost container thereof, lifting means for engaging opposite sides of the container above said lowermost container and movable upwardly to raise the remainder of the stack from said lowermost container, one of said support members being laterally retractable to discharge the lowermost container by falling thereof to a lower position for dispensing from said apparatus, said stack lifting means being movable downwardly to dispose the next lowermost container of the stack on said pair of support members after said retractable member has returned to its projected position, a toggle link connecting between said housing means and said one support member, means mounting said support member on said housing for reciprocation between stack engaging and disengaging positions, an operating rod connected to said toggle link at one end thereof, means disposed adjacent the other end of said rod for engagement by said stack lifting means during upward movement of the latter to raise said rod and retract said one support member.

References Cited
UNITED STATES PATENTS

| | | | |
|---|---|---|---|
| 1,734,108 | 11/1929 | Bergmann et al. | 221—221 |
| 3,189,217 | 6/1965 | Cease | 221—297 |

WALTER SOBIN, *Primary Examiner.*

U.S. Cl. X.R.

221—297